United States Patent Office 3,473,932
Patented Oct. 21, 1969

3,473,932
CHEWING GUM COMPOSITIONS
Julius Sirota, South Plainfield, and James A. Kennedy, Jr., Short Hills, N.J., assignors to National Starch and Chemical Corporation, New York, N.Y., a corporation of Delaware
No Drawing. Filed Dec. 16, 1966, Ser. No. 602,135
Int. Cl. A23g 3/30
U.S. Cl. 99—135                                    4 Claims

ABSTRACT OF THE DISCLOSURE

Chewing gum compositions containing as the primary ingredient thereof, a homo- or copolymer of vinyl acetate which has been hydrolyzed to the extent that from about 1 to 15% of its original number of acetate groups are converted into hydroxyl groups.

BACKGROUND OF THE INVENTION

Since the nature of the resinous base component of a chewing gum composition is generally highly determinative of the properties which it will exhibit, it is essential that such resinous bases meet a rigid set of requirements. Thus, they should be non-toxic, clean, odorless, tasteless, colorless, non-sticky, elastic, economical, insoluble in water, resistant to decomposition and depolymerization, resistant to oxidation and embrittlement upon aging, resistant to conversion into toxic products, and resistant to flavor dissipation, etc. Of primary important is the requirement that these resinous bases should impart a permanent chewability to the chewing gum composition, i.e. they should provide resistance to the stiffening and formation of poor taste which is usually evident upon mastication of a chewing gum product.

Many natural and synthetic resins have been utilized in chewing gum in an attempt to meet these stringent requirements. Thus, despite its many advantages, chicle, which has been the most widely used natural resin, is, unfortunately, characterized by its high cost, limited supply, lack of uniformity, and need for plasticization.

In recent years, synthetic resins such as polyvinyl acetate have replaced natural resins as the resinous base component of chewing gum compositions. Thus, polyvinyl acetate has been found to exhibit many of the above cited requirements while avoiding the substantial fluctuations in price and supply which are characteristic of natural resins. Furthermore, its synthetic origin enables the practitioner to formulate a much wider variety of chewing gum products. These advantages have been nullified, however, by the necessity to improve upon the plasticity and chewing characteristics of polyvinyl acetate which has led to the use of post-polymerization plasticization techniques whereby extraneous plasticizers are blended with the polyvinyl acetate subsequent to its polymerization. Thus, plasticizers such as ester gums and dibutyl phthalate have, in this manner, been combined with polyvinyl acetate in order to improve its plasticity. This technique has proved unsatisfactory, however, inasmuch as these extraneous plasticizers tend to migrate from the chewing gum during mastication and, in addition, they dissolve in saliva thereby producing offensive odors and/or tastes. Furthermore, as the plasticizer is leached from the chewing gum, the gum loses the desired properties of softness and plasticity, thereby leaving a hard, tasteless, unappealing residue.

In order to overcome the disadvantages inherent in these post-polymerization plasticization procedures, the use of polyvinyl acetates which have been internally plasticized via graft and/or conventional copolymerization techniques has been resorted to. Thus, among the components that have been grafted and/or copolymerized with polyvinyl acetate are included: vinyl stearate, vinyl pelargonate, polyalkylene glycols, polyisobutylene and polyisoprene. The resulting internally plasticized polymers have not, however, been completely effective as chewing gum bases.

SUMMARY OF THE INVENTION

It is, thus, the prime object of this invention to provide a novel class of resinous base materials for use in the preparation of chewing gum formulations, said resin bases exhibiting all of the properties required in such bases and, in particular, being able to impart the property of permanent chewability to the resulting chewing gum formulations. It is a further object to proper chewing gum compositions which do not require excessive mastication in order to be converted into a soft, readily chewable mass and which, despite prolonged mastication, maintain their original flavor and chewing characteristics. Various other objects and advantages of this invention will become apparent to the practitioner from the following description thereof.

We have now found that all of the previously described characteristics required in a satisfactory chewing gum base are met by utilizing partially hydrolyzed vinyl acetate polymers, having certain specified properties as hereinafter described, as the resin base component of the novel chewing gum compositions of this invention. Thus, the specified partially hydrolyzed vinyl acetate polymers employed in our novel chewing gums are found to provide resin bases which are tasteless, odorless, clean, non-toxic, economical, resistant to degradation and to conversion into toxic materials, etc. Of great significance is the fact that these hydratable chewing gum bases do not require admixture with extraneous plasticizers in order to produce a chewing gum which exhibits improved, "permanent" chewing properties, thereby precluding the occurrence of plasticizer migration and the disadvantages inherent therein. Furthermore, these novel resin bases possess the unique ability to be plasticized merely upon contact with water, the latter property thereby permitting the use of a decreased concentration of gum base in order to obtain a specified volume of chewable material. Our novel chewing gums also require less mastication in order to reduce the solid gum to a soft, readily chewable mass. In addition, the specified partially hydrolyzed vinyl acetate polymers are completely compatible with the other components ordinarily employed in chewing gum compositions.

DESCRIPTION OF THE PREFERRED EMBODIMENTS

The partially hydrolyzed polyvinyl acetates applicable for use, as resin base components, in the novel chewing gums of this invention are limited with regard to the molecular weight of the polyvinyl acetate utilized in their preparation as well as by the number of acetate ester groups of these polyvinyl acetates which have been hydrolyzed to hydroxyl groups. Thus, expressing molecular weight in terms of intrinsic viscosity (I.V.), the intrinsic viscosity, as determined in acetone at 30° C., of the applicable polyvinyl acetates should range from about 0.08 to 0.15, although the use of lower molecular weight polymers, i.e. those whose I.V. range from about 0.09 to 0.12, is preferred.

It should be noted that it may also be possible to utilize hydrolyzed copolymers of vinyl acetate as resinous bases for the novel chewing gum formulations of this invention. Thus, for example, one may employ hydrolyzed copolymers of vinyl acetate with on ore more of such vinyl type monomers as lower, (i.e. $C_1$–$C_8$), alkyl esters of acrylic and methacrylic acid such as ethyl acrylate and octyl acrylate; substituted or unsubstituted mono or dialkyl esters of alpha, beta-unsaturated dicarboxylic acids such as the substituted mono and dibutyl fumarate esters as well as the corresponding maleates, itaconates and citraconates; and, graft copolymers prepared by polymerizing vinyl acetate in the presence of a previously prepared polymer such as polyisobutylene or a polyalkylene glycol such as polypropylene glycol, the resulting products thereby comprising polymeric materials wherein short lengths of polyvinyl acetate moieties are attached or grafted onto the chain of the previously prepared polymer base. All those copolymers and graft copolymers should preferably contain at least about 75%, by weight, of vinyl acetate moieties.

The procedures utilized for hydrolyzing the acetate ester groups of polyvinyl acetate are well known to those skilled in the art. Thus, the polyvinyl acetate is usually dispersed in water and then refluxed in the presence of either acid or alkaline catalysts. For purposes of this invention, the use of partially hydrolyzed polyvinyl acetate which has been prepared by means of acidic hydrolysis with acidic catalysts such as p-toluenesulfonic acid is preferred inasmuch as such partially hydrolyzed polyvinyl acetates are found to be lighter in color, less viscous and more stable than those prepared with alkaline catalysts. It should be noted that the percent hydrolysis can be readily controlled by simply altering one or more of the process variables utilized in the hydrolysis procedure such, for example, as the reaction time, the concentration of catalyst, or the concentration of water, etc.

In order to be applicable for use in preparing the products of this invention, the polyvinyl acetates should be hydrolyzed to the extent that from about 1 to 15% of their original number of acetate groups are converted into hydroxyl groups. Products whose percent hydrolysis exceeds about 15% are found to be too soft and sticky to be effectively used in the preparation of chewing gum, while products whose percent hydrolysis falls below about 1% are not sufficiently dissimilar from unhydrolyzed polyvinyl acetate to be able to overcome the difficulties inherent in the use thereof.

The other essential ingredients of the chewing gum formulations of this invention are the mineral filler, the sweetening agent and the flavoring agent. The mineral fillers which are utilized must be finely ground, inert, non-toxic, tasteless and not exceedingly abrasive. In addition, they must not crumble during the chewing process. Inert pigments may also be incorporated into the chewing gum formulations as part of the filler content in order to color the mix. Typical inert pigments and filler materials include: precipitated chalk, clay, barium sulfate, magnesium oxide, silica, talc, carbon black, iron oxide, yellow ochre, magnesium carbonate and calcium sulfate, etc.

As sweetening agents, there may be employed sucrose, dextrose, invert sugar, honey, levulose, saccharin, and cyclamates, etc. As flavoring agents, there may be employed any of the naturally derived or synthetic based materials including essential oils, such as oil of spearmint, peppermint, wintergreen, etc., as well as such other flavoring agents as licorice, vanilla, powdered cocoa, and natural and synthetic fruit flavors, etc.

Any of the known methods for the preparation of conventional chewing gum products may be employed in preparing the chewing gums of this invention. Thus, in general, the resinous base is initially blended together with any modifying agents whose presence may be desired in the final product. The blending is conducted at temperatures ranging from about 120–170° C. until a homogeneous mass which is free from undissolved particles is obtained. The fillers and pigments are thereupon added at temperatures ranging from about 110–120° C. and, thereafter, the sweetening and flavoring agents are thoroughly dispersed therein. The resulting homogeneous mass may then be passed through a mill to form sheets which can be treated and cut into chewing gum sticks. Needless to say, other forms such as pellets may also be prepared in this manner.

With regard to proportions, as finally prepared the chewing gum formulations of this invention typically contain a concentration of partially hydrolyzed polyvinyl acetate ranging from about 10 to 97%, by weight; a concentration of inert filler ranging from about 1 to 40%, by weight; and, a concentration of flavoring agent ranging from about 1 to 30%, by weight. The precise concentration of sweetening agent to be employed will, of course, be determined by the taste desired in the resulting product. The latter suggested ranges should, however, be considered as being merely illustrative inasmuch as it may well be possible to prepare operable formulations having concentrations of components which fall outside of these ranges. The presence of excessive amounts of filler, however, has the disadvantage of lowering the amount of sweetening agent that can be carried by the chewing gum base.

Optional additives may be incorporated into the chewing gum formulations of this invention in order to modify certain properties thereof. Among these additives may be included waxes which are used to lubricate and facilitate the high speed manufacturing process; conditioning agents such as glycerine and propylene glycol; and, various medicinal compounds. Furthermore, the partially hydrolyzed polyvinyl acetate bases utilized in the chewing gums of this invention may, if desired, by utilized in conjunction with conventional chewing gum bases such as chicle, rubber, polyisobutylene, butyl rubber, etc. as well as with unhydrolyzed polyvinyl acetate; the presence of the partially hydrolyzed polyvinyl acetate thereby serving to improve upon the chewability of these conventional bases. When utilized in this manner, it is preferable to employ a polyvinyl acetate wherein from about 10 to 15% of its acetate groups have been hydrolyzed and which is usually added in a minimum concentration of about 25%, as based on the weight of the total resin base composition. In addition, when blends of hydrolyzed and unhydrolyzed polyvinyl acetate are employed, it is essential that the concentration of hydrolyzed acetate groups therein should still range from about 1 to 15% of the total number of acetate groups present in the polymer mixture.

The chewing gum compositions of this invention exhibit all the characteristics required of such products. Thus, they are completely devoid of the undesirable odors and/or tastes exhibited after the prolonged chewing of conventional chewing gums. Furthermore, owing to the permanent plasticity of the resinous bases of these novel chewing gums, their initial chewing characteristics such as softness and plasticity are retained even though the gum may be subjected to prolonged mastication.

In the following examples, which further illustrate the embodiment of this invention, all parts given are by weight unless otherwise specified.

Example I

This example illustrates a typical procedure for preparing the partially hydrolyzed polyvinyl acetates which are applicable for use in the preparation of the novel chewing gum products of this invention.

The following ingredients were introduced into a vessel equipped with means for mechanical agitation.

| | Parts |
|---|---|
| Polyvinyl acetate (I.V. of 0.11, as determined in acetone at 30° C.) | 1760 |
| Water | 160 |
| p-Toluenesulfonic acid | 3.2 |

Under agitation, the above ingredients were refluxed at a temperature of 212° F. for a period of 2.5 hours at which time a clear solution resulted. The catalyst was neutralized by the addition of 0.75 part of sodium hydroxide and the resulting product washed several times with boiling water in order to remove the free acetic acid and the residual salts. A steam distillation conducted at 300° F. was used to remove the residual water and it was, thereafter, possible to draw off the hydrolyzed polyvinyl acetate in molten form.

On analyzing a sample of the resulting product, it was determined that 10% of the acetate groups in the polyvinyl acetate has been hydrolyzed to hydroxyl groups.

Example II

This example illustrates the preparation of a chewing gum composition typical of this invention utilizing the 10% hydrolyzed polyvinyl acetate whose preparation was described in Example I, hereinabove.

A homogeneous mass comprising 75 parts of the 10% hydrolyzed polyvinyl acetate and 25 parts of precipitated chalk was prepared by stirring the ingredients at a temperature of about 120° C. for a period of 2 hours. Thereupon, 25 parts of sugar, 5 parts of glucose and 1 part of oil of peppermint were thoroughly admixed with the latter mixture. The resulting homogeneous mass was then milled and converted into sticks of chewing gum.

Upon prolonged chewing, the chewing gum thus produced was found to maintain its softness, plasticity and taste, thereby indicating the permanent chewability characteristics of the chewing gum compositions of this invention.

Example III

This example illustrates the excellent properties exhibited by a variety of partially hydrolyzed polyvinyl acetates applicable for use in preparing the novel chewing gums of this invention. It further illustrates the advisability of utilizing partially hydrolyzed polyvinyl acetates which have been hydrolyzed to the extent of from about 1 to 15% of their available acetate groups.

Utilizing the general procedure set forth in Example I, hereinabove, a number of different partially hydrolyzed polyvinyl acetates were prepared which exhibited varying degrees of hydrolysis. The resulting partially hydrolyzed polyvinyl acetates were then submitted to the following test procedures:

*Moisture pickup.*—One gram samples of the various hydrolyzed products were weighed both before and after immersion in water at 105° F. for a period of 24 hours. The resulting weight increase is termed the "moisture pickup." Higher moisture pickup values are preferred since they indicate the need for less chewing time in order to masticate the solid gum into a soft, readily chewable mass.

*Equilibrium moisture pickup.*—The procedure in the moisture pickup test, as described hereinabove, was repeated with the exception that the sample was immersed for a period of one week in order to permit the samples to reach equilibrium with regard to the amount of moisture absorbed.

*Penetrability.*—By measuring "flow under stress" characteristics, this test procedure indicates the "ease of chew" of the various partially hydrolyzed polyvinyl acetate samples. Thus, the saturated samples resulting from the "equilibrium moisture pickup" test were placed into the core of polytetrafluoroethylene rings having an inner diameter of ⅝" and a depth of 10 mm. The filled rings were conditioned by being immersed in water at 72° F. for a period of 24 hours and the penetrability of the resin samples thereupon determined by the use of a Micrometer Adjustment Pentrometer as manufactured by the Krebs Electric and Manufacturing Co. of New York. This instrument provides a penetration cone weighing 29.5 grams which is allowed to penetrate the sample of partially hydrolyzed polyvinyl acetate for a period of one second whereupon its movement is arrested and the depth of penetration measured with a dial micrometer calibrated in tenths of a millimeter.

A greater depth of penetration is thus indicative of easier chewability. It should be noted, however, that penetrations which exceed about 8 mm. are indicative of bases that are too soft and tacky to be effectively utilized in the preparation of chewing gum compositions and such bases are therefore inapplicable for use in preparing the novel chewing gums of this invention.

The results of the various tests are presented in the following table:

| Percent Hydrolysis of the Partially Hydrolyzed Polyvinyl Acetate | Moisture Pickup (percent) | Equilibrium Moisture Pickup (percent) | Penetrability (mm.) |
|---|---|---|---|
| 0 | 3 | 10 | 0.5 |
| 1 | 3 | 13 | 0.7 |
| 2.5 | 4 | 16 | 1.0 |
| 5 | 5 | 20 | 2.1 |
| 5* | 5 | 19 | 1.9 |
| 10 | 6 | 25 | 4.1 |
| 15 | 8 | 28 | 7.9 |
| 25 | 10 | 30 | >10.0 |

*A blend of equal parts of a 10% hydrolyzed polyvinyl acetate and a conventional, unhydrolyzed polyvinyl acetate.

The data summarized above thus serves to indicate the excellent moisture pickup exhibited by the partially hydrolyzed polyvinyl acetate resins applicable for use in the novel chewing gums of this invention and thereby demonstrates their improved degree of permanent chewability and plasticity. This data further serves to illustrate the necessity for utilizing only those polyvinyl acetates which have been partially hydrolyzed to the extent of from about 1 to 15% of their acetate groups.

Example IV

This example illustrates the permanent chewability of chewing gum formulations containing the partially hydrolyzed polyvinyl acetate bases of this invention as contrasted with the lack of such properties in conventional chewing gum compositions.

The general procedure as set forth in Example II, hereinabove, was utilized to prepare the chewing gum formulations described in the following table:

| | Parts | | | | |
|---|---|---|---|---|---|
| Formulation # | 1 | 2 | 3 | 4 | 5 |
| Ingredients: | | | | | |
| 5% hydrolyzed polyvinyl acetate | 100 | 90 | | | |
| Unhydrolyzed polyvinyl acetate | | | 85 | 85 | 75 |
| Chicle | | 10 | | | 10 |
| Dibutyl phthalate | | | 15 | 10 | 10 |
| Glycerine | | | | 5 | |
| Paraffin oil | | | | | 5 |

The resulting products were masticated and their properties then evaluated. Formulations #1 and #2 remained permanently plasticized and apparently unaffected after having been masticated for a period of two hours. The conventional formulations, i.e. Formulations #3, #4 and #5, which contained extraneous plasticizers and conditioners, exhibited bitter tastes and hardening characteristics after a mastication period of only about 30 minutes.

It is thus evident that the novel chewing gum compositions of this invention are greatly improved over conventional products with regard to their resistance to the stiffening and formation of bad tastes which typically result upon the mastication of such conventional products.

Example V

This example illustrates the preparation of additional chewing gum compositions typical of this invention.

The formulations described in the following table were prepared according to the general procedures set forth in Example II, hereinabove.

| Formulation # | 1 | 2 | 3 | 4 | 5 | 6 | 7 | 8 |
|---|---|---|---|---|---|---|---|---|
| Ingredients: | | | | | | | | |
| 1% hydrolyzed polyvinyl acetate | 90 | | | | | | | |
| 2.5% hydrolyzed polyvinyl acetate | | 85 | | | | | | |
| 5% hydrolyzed polyvinyl acetate | | | 80 | | | | | |
| 10% hydrolyzed polyvinyl acetate | | | | 70 | 30 | | | |
| 15% hydrolyzed polyvinyl acetate | | | | 25 | | | | |
| 85:15 vinyl acetate:octyl acrylate copolymer wherein 2.5% of the acetate groups had been hydrolyzed to hydroxyl groups | | | | | | 80 | | |
| A graft copolymer which resulted from the polymerization of 250 parts of vinyl acetate in the presence of 50 parts of polyisobutylene and wherein 5% of the acetate groups had been hydrolyzed to hydroxyl groups | | | | | | | 80 | |
| Unhydrolyzed polyvinylacetate | | | | 55 | | 40 | | |
| Rubber #1, pale crepe | | | | 10 | 10 | | | |
| Precipitated chalk | 10 | 15 | 20 | 20 | 20 | 20 | 20 | 20 |
| Paraffin wax | | | | | 20 | | | |
| Sugar | 50 | 45 | 40 | 35 | 30 | 35 | 40 | 40 |
| Oil of peppermint | | | | 1 | 1.5 | 1.5 | 1.5 | |
| Oil of spearmint | | 1 | | | | | 1 | |
| Oil of wintergreen | | | 1 | | | | | 1 |

Each of the resulting compositions required only a short period of mastication prior to being to a soft, readily chewable mass. Upon further mastication, they were found to retain their initial flavor and chewability characteristics as evidenced by their resistance to stiffening and to the formation of bad tastes.

Summarizing, it is thus seen that this invention provides for the preparation of novel chewing gum compositions which are characterized by their permanent chewing properties. Variation may be made in procedures, proportions and materials without departing from the scope of this invention which is defined by the following claims.

We claim:

1. A chewing gum composition comprising an intimate blend of (1) a vinyl acetate polymer hydrolyzed to the extent that from about 1 to 15% of its original number of acetate groups are converted into hydroxyl groups, said polymer containing at least about 75%, by weight, of vinyl acetate moieties; (2) an inert filler; (3) a flavoring agent; and, (4) a sweetening agent.

2. The chewing gum composition of claim 1, wherein said vinyl acetate polymer has an intrinsic viscosity, as determined in acetone at 30° C., of from about 0.08 to 0.15.

3. The chewing gum composition of claim 1, wherein said vinyl acetate polymer is homopolymer of vinyl acetate.

4. The chewing gum composition of claim 1, wherein said vinyl acetate polymer is a copolymer of vinyl acetate with one or more vinyl comonomers.

References Cited

UNITED STATES PATENTS

| | | | |
|---|---|---|---|
| 2,286,712 | 6/1942 | Borglin | 99—135 |
| 2,413,239 | 12/1946 | Manson | 99—135 |
| 3,063,844 | 11/1962 | Meguro et al. | 99—135 |
| 3,156,678 | 11/1964 | Dexheimer et al. | 260—89.1 |
| 3,268,496 | 8/1966 | Germain | 260—85.7 |

FOREIGN PATENTS

| | | |
|---|---|---|
| 587,797 | 5/1947 | Great Britain. |
| 922,459 | 4/1963 | Great Britain. |
| 971,182 | 9/1964 | Great Britain. |

LIONEL M. SHAPIRO, Primary Examiner

WILLIAM C. LAWTON, Assistant Examiner

U.S. Cl. X.R.

260—80.81, 85.7, 89.1